US008761683B2

(12) United States Patent
Warren et al.

(10) Patent No.: US 8,761,683 B2
(45) Date of Patent: Jun. 24, 2014

(54) ELECTRONIC DEVICE INSTRUCTIONS PROVIDED USING RADIO SIGNALS

(75) Inventors: Daniel A. Warren, San Jose, CA (US); Matthew Rogers, Sunnyvale, CA (US); Timothy Patrick Hannon, Campbell, CA (US); Michael Ingrassia, San Jose, CA (US)

(73) Assignee: Apple Inc., Cupertino, CA (US)

( * ) Notice: Subject to any disclaimer, the term of this patent is extended or adjusted under 35 U.S.C. 154(b) by 494 days.

(21) Appl. No.: 12/549,911

(22) Filed: Aug. 28, 2009

(65) Prior Publication Data

US 2011/0051787 A1    Mar. 3, 2011

(51) Int. Cl.
*H04B 17/00* (2006.01)
*H04H 60/13* (2008.01)
*H04B 7/00* (2006.01)

(52) U.S. Cl.
CPC .............. *H04B 17/00* (2013.01); *H04H 60/13* (2013.01); *H04B 7/00* (2013.01)
USPC ....................................... 455/67.11; 375/224

(58) Field of Classification Search
USPC ...................................................... 455/67.11
See application file for complete search history.

(56) References Cited

U.S. PATENT DOCUMENTS

| 3,609,667 | A | * | 9/1971 | Messer ........................... 710/72 |
| 5,393,713 | A | | 2/1995 | Schwob |
| 6,404,408 | B1 | | 6/2002 | Emerson, III |
| 6,603,751 | B1 | * | 8/2003 | Odenwalder ................. 370/331 |
| 2002/0024624 | A1 | * | 2/2002 | Takenaka ...................... 349/110 |
| 2004/0064787 | A1 | * | 4/2004 | Braun et al. ................... 715/505 |
| 2006/0160486 | A1 | | 7/2006 | Smallcomb et al. |
| 2006/0198359 | A1 | * | 9/2006 | Fok et al. ....................... 370/351 |
| 2007/0254633 | A1 | * | 11/2007 | Mathew et al. ............ 455/412.1 |
| 2007/0280257 | A1 | | 12/2007 | Vare et al. |
| 2009/0129005 | A1 | * | 5/2009 | Kim et al. ................. 361/679.26 |
| 2009/0172393 | A1 | * | 7/2009 | Tanik et al. .................... 713/160 |
| 2009/0264149 | A1 | * | 10/2009 | Miller et al. ............... 455/552.1 |
| 2009/0309860 | A1 | * | 12/2009 | Hsu et al. ....................... 345/211 |
| 2009/0323947 | A1 | * | 12/2009 | Aoyama et al. ............... 380/201 |
| 2010/0323689 | A1 | * | 12/2010 | Topaltzas et al. ............. 455/425 |

FOREIGN PATENT DOCUMENTS

GB    2367965 A    4/2002

* cited by examiner

*Primary Examiner* — Gennadiy Tsvey
(74) *Attorney, Agent, or Firm* — Meyertons, Hood, Kivlin, Kowert & Goetzel, P.C.

(57) ABSTRACT

Systems, methods, and machine-readable media are disclosed for controlling an electronic device using data transmitted over radio signals. In some embodiments, a radio source may embed instructions to control an electronic device into a radio signal. For example, the radio source may use the RDS communications protocol to transmit the instructions in an FM radio signal. The electronic device may receive the radio signal and may perform the instructions included in the radio signal. For example, in a testing environment, the instructions can include commands to test the electronic device's radio using test parameters specified in the instructions. Responsive to receiving the test parameters, the electronic device may configure itself (e.g., turn on or off certain components) and record audio from a specified radio station.

20 Claims, 7 Drawing Sheets

ELECTRONIC DEVICE INSTRUCTIONS PROVIDED USING RADIO SIGNALS

FIELD OF THE INVENTION

This is directed to using radio signals, such as frequency modulated ("FM") broadcast signals, to instruct an electronic device to perform various operations.

BACKGROUND OF THE INVENTION

Many of today's electronic devices, and in particular portable electronic devices, have multiple functionalities. For example, current cellular telephones may provide a web browser for surfing the Internet and checking e-mail, a music player for playing MP3 files stored on the device, a camera for capturing pictures and videos, and a radio receiver for tuning to various radio stations in the geographic area. This way, consumers can use a single device for business and/or entertainment purposes and do not need to carry around multiple portable devices.

An engineer may encounter many obstacles when designing a multi-functional device. In particular, because the space on a portable device is limited, one concern when designing, manufacturing, or preparing a device for shipment is that the various components of the device will interfere with one another and lower the overall quality of performance. For example, the audio quality or tuning ability of the radio receiver implemented on a device may be affected by whether the camera is in use.

Accordingly, thorough tests of the electronic device may be run to ensure that the device is capable of sufficiently high performance in various operating scenarios and under various operating conditions. The test equipment used in running the tests, however, may interfere with how the device would perform outside of the testing environment (e.g., when operated by a consumer).

SUMMARY OF THE DISCLOSURE

Accordingly, systems, methods, and machine-readable media are disclosed for controlling electronic devices using radio signals. As described in detail below, the disclosed embodiments may be used within a testing environment to control the operating scenarios or conditions of a device test (e.g., which device components to turn on, how long to run a test), or the disclosed embodiments may be used outside of a testing environment.

In some embodiments, instructions may be provided from a radio source to an electronic device using an FM radio signal, such as in a data packet transmitted using the radio data system ("RDS") protocol. For example, the radio source may select one or more instructions for the electronic device to perform, create a data packet (e.g., an RDS data packet) including the one or more instructions, and embed the data packet into a radio signal. The radio source can broadcast the radio signal, which can include an audio portion and the embedded data packet, to one or more electronic devices. In some embodiments, the radio source may add a checksum to the data packet using a particular encoding scheme. This way, an electronic device receiving the radio signal can differentiate the instruction-carrying data packet from other non-instruction-carrying data packets.

The electronic device may be configured to receive and interpret the instructions included in the radio signal. For example, the electronic device may include radio tuning circuitry for receiving the radio signal and decomposing the radio signal into an audio portion and embedded data portion. Audio processing circuitry may be used to process the audio portion of the radio signal for playing by the electronic device. The electronic device may perform any instructions included in the embedded data portion of the electronic device, such as instructions for the audio processing circuitry to alter how the audio portion is played. For example, based on the instructions, the audio processing circuitry may be directed to change volume or equalization settings, or to block the audio portion for parental control purposes.

In some embodiments, the instructions can include commands to launch a non-radio-related application (e.g., a web browser application, a map application, a music playback application, an online music store application, etc.). In some embodiments, the instructions may be associated with a song or other media element currently being played by a radio source. For example, the instructions can command the electronic device to retrieve metadata (e.g., information or graphics, such as album cover art) associated with the current song, such as from a website or from a local storage component of the electronic device.

In a testing environment, a radio source may issue commands that enable the electronic device to set up and run a test of its components. One such test may be a test of the device's radio capabilities, such as of the performance of the device's radio tuning circuitry and/or audio processing circuitry. Such a test may sometimes be referred to as a "radio test."

In some embodiments for running radio tests, the instructions that may be embedded in a radio signal may include test parameters that instruct the electronic device how to configure itself for the radio test and how to run the radio test. For example, the test parameters can instruct the electronic device on which device components to turn on or off during the test, which radio station to tune to during the test, and how long to record audio from the specified radio station. Because the instructions are transmitted using a radio signal, the electronic device does not need to use infrared ("IR") signals or physical cables, let alone physical inputs, to receive these instructions, which could interfere with the device's radio tuning circuitry and render the results of the test ineffectual.

In some embodiments, using test equipment, the electronic device may be oriented in some position with respect to the radio source or the operating conditions of the testing environment may be changed. The test equipment may include, for example, a movable table that supports the electronic device. The test equipment may be altered manually by a test engineer, or the radio source may send "test equipment parameters" to the test equipment so that the test equipment can alter itself. The test equipment parameters may include, for example, instructions on how the test equipment should position the electronic device.

Alternatively or additionally, the radio source may provide the test equipment parameters to the electronic device using instructions embedded in a radio signal. The electronic device may not change its own operations based on the test equipment parameters, but may instead associate the test equipment parameters with other test parameters and the results of the test. This way, the results of the test may be analyzed based on the testing conditions imposed by the test equipment and the other test parameters of the device itself.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION

Systems, methods, and machine-readable media (e.g., computer-readable media) are disclosed for controlling and testing an electronic device using instructions provided in a radio signal.

Figure 1:
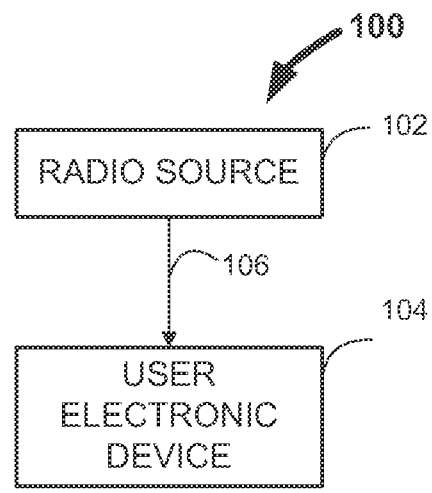
FIG. 1 is a schematic view of a radio system configured in accordance with various embodiments of the invention.

FIG. 1 is a schematic view of illustrative radio system 100 configured in accordance with various embodiments of the invention. Radio system 100 can include radio source 102 and user electronic device 104. In some embodiments, radio system 100 can include multiple radio sources 102, multiple user electronic devices 104, or both multiple radio sources 102 and multiple user electronic devices 104. To prevent overcomplicating the drawing, only one radio source 102 and user electronic device 104 are illustrated.

Radio source 102 can include any suitable electronic system capable of broadcasting radio signals to one or more electronic devices, such as user electronic device 104. For example, radio source 102 may include a commercial radio station that broadcasts music, commercials, talk shows, interviews, and other audio programs over a radio channel. In some embodiments, radio source 102 may include a device used in a testing facility. For example, radio source 102 may include a test control station for issuing test instructions or test parameters to other devices. An example of such an embodiment will be described below in connection with FIG. 2.

Radio source 102 can transmit radio signals to one or more electronic devices over communications link 106. Communications link 106 can include an over-the-air radio link, and may allow radio source 102 to use any suitable radio transmission protocol or modulation scheme, such as amplitude modulation ("AM") or frequency modulation ("FM"), to broadcast data. For example, communications link 106 may enable radio source 102 to provide media, information, instructions, or any other data to electronic device 104 using a frequency and/or amplitude assigned to radio source 102 or using an out-of-band frequency. An "out-of-band" frequency may hereinafter refer to a radio frequency that is not within an established range of frequencies typically used by commercial radio stations, and therefore an out-of-band frequency may not be assigned to any particular radio station in the geographic area of system 100. In some embodiments, radio source 102 may communicate with user electronic device 104 using another type of link in addition to a radio link, such as a fiber-optic link, a cable link, an Internet link, or any combination thereof.

User electronic device 104 may include any suitable device capable of receiving and interpreting radio signals received from a radio source, such as radio source 102. For example, electronic device 104 can include a portable media player (e.g., an Ipod™ made available by Apple Inc. of Cupertino, Calif.), a cellular telephone (e.g., an Iphone™ made available by Apple Inc.), a pocket-sized personal computer, a personal digital assistant ("PDA"), a desktop computer, a laptop computer, or any combination thereof. Device 104 can include any communications circuitry capable of receiving and processing radio signals received from a radio source, as described below with respect to FIG. 4.

Figure 2:
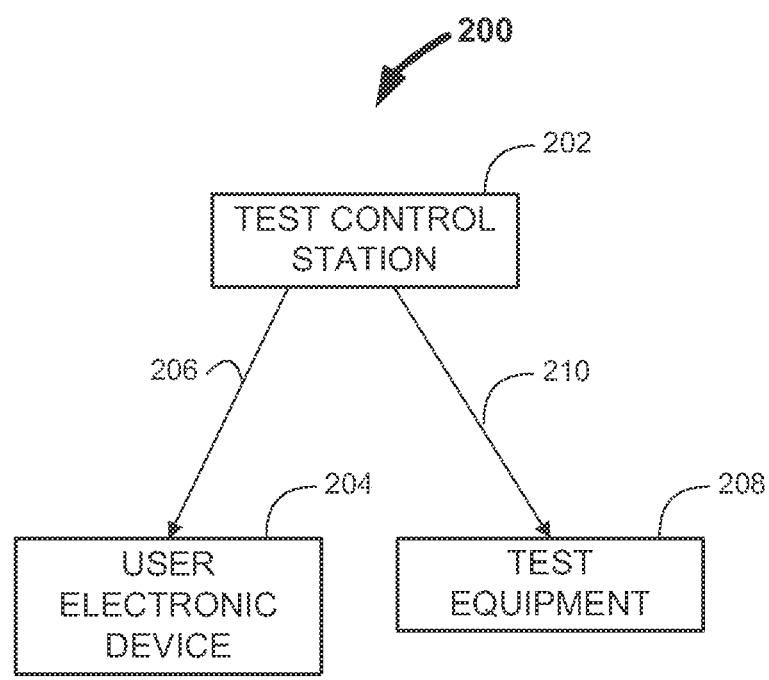
FIG. 2 is a schematic view of a test system for testing a user electronic device configured in accordance with various embodiments of the invention.

Turning to FIG. 2, a schematic view of an illustrative test system 200 is shown. Test system 200 may include test control station 202 and test equipment 208 for testing user electronic device 204 during a design or manufacturing process of device 204. Device 204 may include any of the devices discussed above in connection with device 104 of FIG. 1.

Test control station 202 may have any of the features and functionalities discussed above in connection with radio source 102 of FIG. 1, and vice versa. In some embodiments, test control station 202 may provide test parameters to electronic device 204 over radio communications link 206, such as using a protocol referred to commonly as "radio data system," ("RDS") or a similar protocol referred to commonly as "radio broadcasting data system," ("RBDS"). While various embodiments disclosed herein may be described as using the RDS protocol, any reference to the RDS protocol should be read to include the RBDS protocol as another option. The RDS protocol may enable test control station 202 to embed the test parameters into a small data packet and modulate the test parameters into a sub-carrier of an FM radio signal.

The test parameters issued over an RDS data packet or another communications standard may be used by device 204 to set up and initiate a test of the quality of the device's radio receiver or any other component of the device. For simplicity, a test of a device's radio receiver may sometimes be referred to as a "radio test." For example, test control station 202 may instruct device 204 to run a radio test by tuning to and recording audio from a particular radio station. The recorded audio may subsequently be analyzed by a test engineer to determine the tuning quality and the audio quality of the radio receiver of device 204. By using radio communications link 206 to instruct device 204, user electronic device 204 may not need to turn on an infrared ("IR") receiver or have physical cables connected to device 204 to receive these instructions. IR communication or communication over a physical cable might interfere with a radio test, and therefore using a radio signal (e.g., via an RDS data packet) to provide test instructions or parameters may advantageously allow the radio test to run in conditions that more closely simulate real-world operating conditions.

Test control station 202 may also provide instructions to test equipment 208. These instructions may sometimes be referred to as "test equipment parameters." Test equipment 208 may be used for positioning electronic device 204 relative to test control station 202. For example, test equipment 208 can include a movable structure (e.g., a table) that may support device 204. This way, based on the test equipment parameters, test equipment 208 can orient electronic device 204 in a direction that faces towards, away from, or at any suitable angle from test control station 202. In some embodiments, test equipment 208 can move towards, away, or in any other direction based on the test equipment parameters so that test equipment 208 can change how far away electronic device 204 is positioned from test control station 202.

Test equipment 208 may further include any other equipment, devices, or components that may affect the testing environment in which electronic device 204 is tested. The testing environment can be within a closed chamber that isolates electronic device 204 from outside interference (e.g., from radio signals from commercial radio stations), or the testing environment can be within an un-isolated location. Either way, test equipment 208 can affect, for example, the temperature, humidity, or lighting of the testing environment. By providing test equipment parameters to test equipment 208, test control station 202 or a test engineer can change the testing environment that device 204 is exposed to. The testing environment may affect the results of the tests on electronic device 204. Therefore, test control station 202 may provide the test equipment parameters to electronic device 204 so that device 204 may store or otherwise associated these test parameters with the results of the test. This way, a test engineer can analyze any recorded audio or other test results with relatively complete knowledge of the testing environment and other parameters of the test.

Test control station 202 may provide test equipment parameters to test equipment 208 over communications link 210. Communications link 210 may have any of the features and functionalities of links 106 and 206 of FIGS. 1 and 2, respectively. In other embodiments, communications link 210 may include a wired or wireless link using any of a variety of protocols, such as a general purpose interface bus ("GPIB") link, an infrared ("IR") link, a Bluetooth™ link, or a Wi-Fi link. For wireless links that may interfere with a radio test, the links may be disabled before the start of the device test.

In some embodiments, test equipment parameters may not be received from test control station 202. For example, a test engineer may physically move or adjust any structures of test equipment 208, or may enter or type parameters into any equipment of test equipment 208 (e.g., a thermostat, etc.). In these embodiments, the test engineer may provide test control station 202 with test equipment parameters indicating the changes or adjustments made by the test engineer. In this way, test control station 202 may provide the test equipment parameters to electronic device 204, as discussed above.

Figure 3:
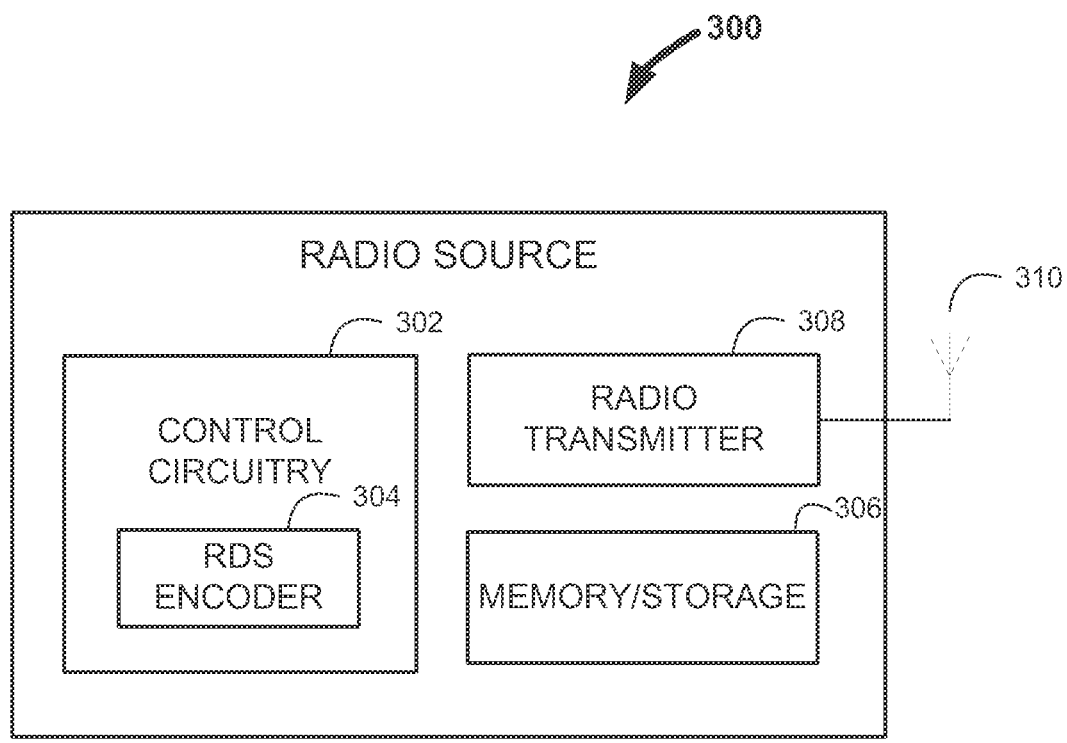
FIG. 3 is a schematic view of a radio source for transmitting radio signals with embedded instructions in accordance with various embodiments of the invention.

Referring now to FIG. 3, a schematic view of radio source 300 is shown in accordance with various embodiments of the invention. Radio source 300 may have any of the features and functionalities of radio source 102 of FIG. 1 and/or test control station 202 of FIG. 2 (and vice versa). Radio source 300 may include control circuitry 302, memory/storage 306, radio transmitter 308, and radio antenna 310. Radio source 300 can include other components not shown in FIG. 3. Also, while only one of each component is illustrated, radio source 300 can include more than one of some or all of the components.

Control circuitry 302 can control the operation and various functions of radio source 300. For example, control circuitry 302 can include one or more processors acting under the control of an application and operating system. The application and operating system may be stored in memory/storage 306 or memory/storage 306 may act as a main memory for the one or more processors. Memory/storage 306 can include any suitable type of computer-readable media, including but not limited to the non-volatile and volatile memories listed below in connection with memory/storage 406 of FIG. 4.

In some embodiments, control circuitry 302 can include RDS encoder 304 for encoding instructions selected by control circuitry 302 into an RDS data packet for transmission over a radio channel. RDS encoder 304 may include a software module executed by a processor, or may be a hardware component (e.g., an application-specific integrated circuit ("ASIC")).

RDS encoder 304 can encode instructions for controlling electronic devices into any suitable field or channel of RDS data. For example, RDS encoder 304 may provide the instructions in an eight-character Program Service Name ("PSN") channel, which may typically be used to provide the call number or other radio identification information associated with radio source 300. Control circuitry 302 may be configured to direct RDS encoder 304 to provide typical PSN channel information at certain periods of time, and to provide instructions for controlling electronic devices at other periods of time. It should be understood that RDS encoder 304 may encode the instructions into one or more other fields of RDS data (e.g., Radio Text ("RT")), or radio source 300 and encoder 304 may use a communications protocol other than an RDS or RBDS protocol to transmit instructions for controlling a device. For example, radio source 300 and encoder 304 may employ a Data Radio Channel ("DARC") communications protocol, any legacy protocols used before RDS and RBDS were widely adopted, any future-developed communications protocols, or any other protocol that employs a suitable sub-carrier and modulation scheme for embedding data into radio signals.

Radio transmitter 308 can modulate an RDS data packet into a radio signal for broadcast by antenna 310. For commercial radio stations, radio transmitter 308 can modulate the RDS data packet along with other audio data (e.g., music, talk shows, interviews, commercials, etc.) into an FM radio signal at a particular frequency. To do this, radio transmitter 308 can include any suitable combination of modulators, encoders, interleavers, or other components necessary to prepare the RDS data and/or audio for broadcast from radio source 300.

Figure 4:
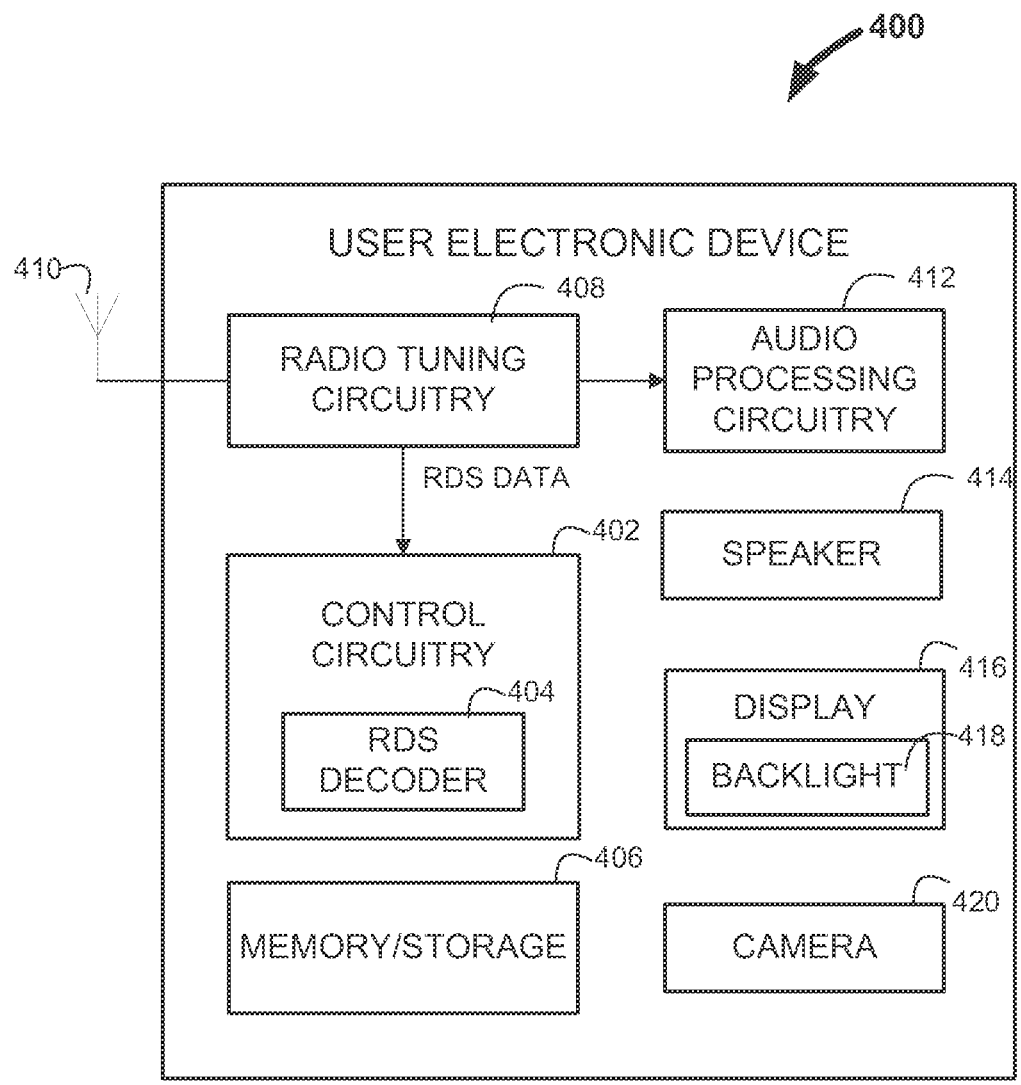
FIG. 4 is a schematic view of a user electronic device for receiving radio signals and performing instructions embedded in the radio signals in accordance with various embodiments of the invention.

Referring now to FIG. 4, a schematic view of user electronic device 400 is shown in accordance with various embodiments of the invention. Electronic device 400 may include any of the features and functionalities of device 104 of FIG. 1 and/or device 204 of FIG. 2 (and vice versa). Electronic device 400 can include control circuitry 402, memory/storage 406, radio tuning circuitry 408, antenna 410, audio processing circuitry 412, speaker 414, display 416, and camera 420. Electronic device 400 can include other components not shown in FIG. 4, such as a power supply for providing power to the components of electronic device 400 and one or more user input components (e.g., a button, keypad, dial, click wheel, touch screen, or accelerometer). Also, while only one of each component is illustrated, electronic device 400 can include more than one of some or all of the components.

Radio tuning circuitry 408 can receive radio signals (e.g., AM or FM radio signals) from antenna 410. In some embodiments, tuning circuitry 408 can demodulate the radio signal and decompose the radio signal into a portion containing audio (e.g., music, talk shows, commercials, or interviews) and a portion containing embedded data (e.g., an RDS data packet). Radio tuning circuitry 408 may provide the audio portion of the radio signal to audio processing circuitry 412 for processing the received audio. For example, audio processing circuitry 412 can include any filters and amplifiers useful in reducing adverse affects from radio transmission and preparing the audio for listening purposes. The processed audio may be recorded into memory/storage 406 (described below) and/or played from speaker 414. Speaker 414 may include any suitable components for providing an audio output, such as headphones, built-in speaker, and the like.

The quality of the audio produced from a radio signal may depend on the performance and capabilities of radio tuning circuitry 408 and audio processing circuitry 412. Accordingly, one or both of these components may be referred to as the "radio receiver" of electronic device 400, and therefore radio tests of electronic device 400 may refer to tests that assess the performance of radio tuning circuitry 408 and/or audio processing circuitry 412.

Radio tuning circuitry 408 can provide any portions of the radio signal containing embedded data to control circuitry 402. Control circuitry 402 can include any suitable hardware components (e.g., application-specific integrated circuits ("ASICs")), one or more processors acting under the control of an application and operating system, or any combination thereof. Control circuitry 402 can control the operation and various functions of device 400. For example, control circuitry 402 can execute any of a variety of applications, such as a radio-related application for controlling radio tuning circuitry 408 and audio processing circuitry 412.

Control circuitry 402 may also execute one or more non-radio-related applications concurrently with or instead of the radio-related application. The non-radio-related applications may include applications that conventionally do not make use data received from radio tuning circuitry 408. For example, non-radio-related applications may include an MP3 player application for playing music stored in electronic device 400, a camera application to control the capture of images or video from camera 420, a web browser application for controlling the websites displayed on display 416, and a map application for displaying a geographic map on display 416. Display 416 can include, for example, a liquid crystal display (LCD), a touch screen display, or any suitable type of display, and may or may not include backlight 418 for illuminating display 416. Camera 420 can include any of a variety of types of cameras, such as a web cam, a still or video camera, or an external or built-in camera.

Using a radio-related application, control circuitry 402 can process any instructions contained within a radio data packet obtained from radio tuning circuitry 408. For example, control circuitry 402 can include RDS decoder 404, which may include a software and/or hardware module, for decoding the RDS data received from radio tuning circuitry 408. Control circuitry 402 may then execute any instructions contained within the decoded RDS data, such as any of the instructions discussed below.

In some embodiments, any applications executed by control circuitry 402 can be stored in memory/storage 406. Memory/storage 406 can include any suitable type of computer-readable medium, such as any suitable combination of non-volatile and volatile memories, including but not limited to cache memory, Flash memory, random access memory ("RAM") (e.g., DDR RAM and/or SRAM), read only memory ("ROM"), a hard drive, an erasable ROM ("EPROM"), an electrically eraseable ROM ("EEPROM"), or any combination thereof. In some embodiments, memory/storage 406 can include a memory module configured for storing firmware for control circuitry 402, such as for device applications (e.g., operating system, user interface functions, and other processor functions).

In some embodiments, memory/storage 406 may include memory modules operative to provide mass storage for electronic device 400. For example, control circuitry 402 may store in memory/storage 406 an audio portion of a radio signal received from a radio source. The audio portion may be recorded from radio tests and stored in memory/storage 406 along with any test parameters and test equipment parameters received from a test control station.

Memory/storage 406 can be used by control circuitry 402 to store music, music videos, movies, books, and other audio, visual, or any other audio/visual or media elements. Memory/storage 406 can store metadata associated with the elements, such as user-generated or automatically-created playlists, or genre, artist, album, album cover art, release date, beats per minute ("BPM") information, lyrics, vocals information, bass line information, or any other suitable information for each media element. Memory/storage 406 can also store any other suitable information, such as preference information (e.g., music playback preferences), lifestyle information, exercise information (e.g., obtained from an exercise monitoring system), transaction information (e.g., credit card information), subscription information (e.g., for podcasts or television shows), and telephone information (e.g., an address book).

The instructions provided by radio source 300 (FIG. 3) and/or received by user electronic device 400 (FIG. 4) can include any suitable type of instructions. For simplicity, the following examples of instructions will be described with reference to electronic device 400 and FIG. 4, although it should be understood that the same or similar instructions may be issued by radio source 102 (FIG. 1), test control station 202 (FIG. 2), and/or radio source 300, and the same or similar instructions may be received and performed by user electronic device 104 (FIG. 1), user electronic device 204 (FIG. 2), and/or test equipment 208 (FIG. 2).

In some embodiments, electronic device 400 may receive instructions embedded in data packets of a radio signal transmitted by a radio station, where the instructions are associated with an audio portion of the radio signal. The audio portion may be broadcast by the radio station for playback by the device. The instructions may include commands to launch one or more non-radio-related applications. For example, the radio station may transmit a radio signal including audio data of a particular song to be played by the device, and the instructions embedded in the data packets (e.g., RDS data) of the radio signal may include commands for the device to load and point a web browser application to a website associated with the song or the song's artist or album. As another example, the instructions may include a command for the device to open an online music store application (e.g., iTunes™ made available by Apple Inc.) and direct the user to a page for purchasing the song.

As still another example, the instructions may include a command for device 400 to search through memory/storage 406 for metadata associated with the current song (e.g., graphics, such as album cover art, or information, such as playlist information, or genre, artist, album, release date, beats per minute ("BPM") information, or a combination thereof). This way, if the song being transmitted by the audio portion of the radio signal is already in the user's local library (e.g., stored as a media file in memory/storage 406), electronic device 400 can display locally-stored graphics or other metadata related to that song while receiving the radio signal. This locally-stored metadata or information available via a web-browser application may be considerably more detailed than information that could be provided directly by the radio station via data embedded in a radio signal. As yet another example, the embedded instruction may include a command for device 400 to open a map application to point the user to a geographic location associated with the radio station transmitting the radio signal or to a location related to the song (e.g., location of the radio broadcasting station, location of a venue at which the artist of the song is scheduled to perform, etc.).

In a testing environment, the instructions embedded in a radio signal received by electronic device 400 may include instructions for the device to start a radio test using test parameters specified in the instructions. In some embodiments, electronic device 400 may receive the test parameters from a PSN field of the embedded RDS data. Table 1 illustrates how the eight characters in a PSN field may be used to provide test parameters:

TABLE 1

| # chars | Instructions |
|---|---|
| 2 | Frequency of radio station to tune to |
| 2 | Length of time to run a radio test |
| 2 | Test equipment parameters |
| 1 | Components of the device to enable/disable |
| 1 | Checksum of the data packet |

As illustrated in Table 1, the test parameters may include commands to tune to particular radio station's frequency during a radio test, the length of time for running a radio test, the test equipment parameters affecting the positioning or ambient conditions of electronic device 400 during a radio test, and the various components of electronic device 400 to be enabled or disabled during a radio test (e.g., camera 420, backlight 418, display 416, and/or any other components of device 400). In some embodiments, the instruction data embedded in a radio signal can further include a checksum that may be computed based on the other characters in the field of the data packet (or any other portions of the embedded data). The checksum may be computed using any suitable coding algorithm or encoding scheme, which may be bypassed when the radio source transmits standard radio information (e.g., call numbers of the radio source). Alternatively, instead of bypassing the encoding scheme when transmitting standard radio information, a checksum may be added to the standard radio information using a different encoding scheme.

In other embodiments, rather than generating a checksum, the instruction data may be encrypted using a suitable encrypting algorithm. In these embodiments, for example, the instruction data embedded in a radio signal can further include a public key and optionally a private key. Thus, responsive to receiving a radio signal with embedded data, electronic device 400 can decrypt, decode, or other process the embedded data to determine whether the radio signal includes instruction data.

In some embodiments, the characters used by the field containing the embedded instruction data (e.g., the 8-character PSN field of Table 1) can include ASCII characters. The ASCII characters may be selected from a set of ASCII characters not typically used in the field. For example, a PSN field is typically used by a radio station to transmit call numbers associated with the radio station, and call numbers often use a combination of alphanumeric characters (i.e., 'A' through 'Z' and '0' through '9'). Therefore, the instruction data embedded in the field (e.g., PSN field) may use non-alphanumeric ASCII characters, such as '!,' '@,' or '$.' This way, electronic device 400 may be able to differentiate between instruction-carrying data packets from non-instruction-carrying data packets.

It should be understood that Table 1 is merely illustrative, and that the test parameters and any other device instructions may be provided using a communications protocol other than RDS and/or using one or more channels other than the PSN channel of the RDS protocol. Moreover, the instruction data packet can include more than eight characters to enable a radio source to provide additional instructions at once, or the data packet can include fewer characters. Also, while Table 1 provides an example of using a PSN channel to provide test parameters, instructions of any other type may be provided in a PSN channel.

The instructions embedded in a radio signal may include any other suitable types of instructions, which may be provided to electronic device 400 for use within or outside of a testing environment. For example, the instructions can include commands for device 400 to alter how the audio portion of the radio signal received from the radio source is played, such as commands to change the volume or equalization settings of device 400 (e.g., based on the genre of a song currently being broadcast) or parental control instructions (e.g., commands for device 400 to block the current song if device 400 belongs to a young child). Responsive to receiving instructions to alter how the audio portion is played, control circuitry 402 can direct audio processing circuitry 412 to process the audio portion based on the received instructions.

In some embodiments, the instructions received by electronic device 400 from a radio signal can include playlist management instructions (e.g., commands for device 400 to add the current song to a playlist), instructions for device 400 to download a software update from a website, instructions for device 400 to update a pedometer component (e.g., for an exercise program), and any combination thereof.

Referring now to FIGS. 5-8, flowcharts of illustrative processes are shown in accordance with various embodiments of the invention. The steps of these processes may be executed by devices or systems capable of radio transmission and/or reception (e.g., radio source 300 of FIG. 3 and/or user electronic device 400 of FIG. 4), or the steps may correspond to machine-readable instructions recorded on machine-readable media (e.g., computer-readable media, memory/storage 306 of FIG. 3, memory/storage 406 of FIG. 4, etc.).

It should be understood that these processes are merely illustrative. Any of the steps may be combined, removed, or modified, and any number of additional steps may be added, without departing from the scope of the invention.

Figure 5:
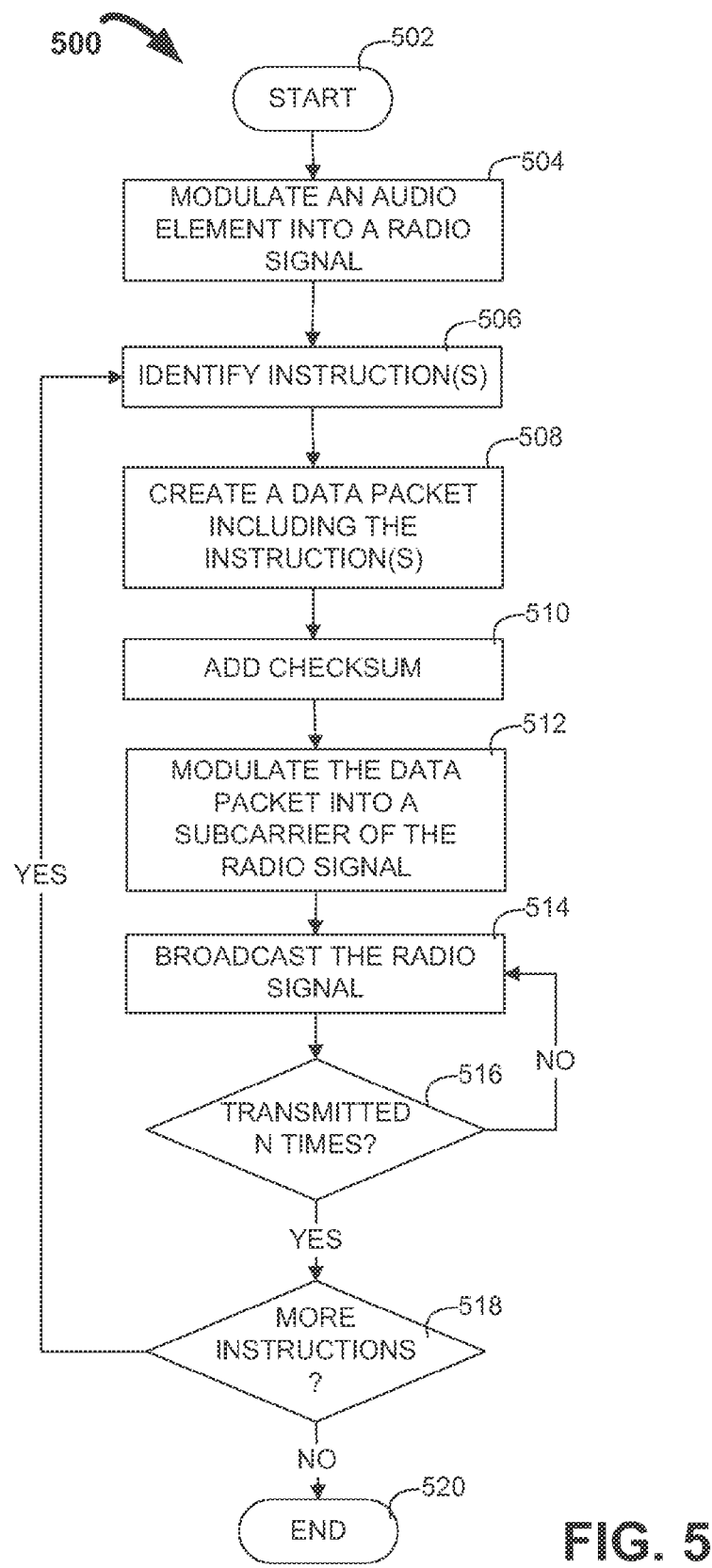
FIG. 5 is a flowchart of an illustrative process for embedding electronic device instructions into radio signals in accordance with various embodiments of the invention.

Referring first to FIG. 5, a flowchart of illustrative process 500 is shown for embedding instructions for an electronic device into radio signals. Process 500 may be executed by a radio source, such as radio source 300 of FIG. 3, a commercial radio station, a test control station (e.g., test control station 202 of FIG. 2), or any other source capable of broadcasting radio signals to one or more user electronic devices.

Process 500 may begin at step 502. Then, at step 504, an audio element may be modulated into a radio signal. The audio element may include, for example, a song, talk show, audio book, interview, or commercial that may be received by an electronic device for playback by the device. In a testing environment, the audio element, if one is present at all, may be modulated into a radio signal having an out-of-band frequency, an in-band but unused frequency (i.e., an in-band frequency not assigned to a radio station in the geographic area of the testing environment), or an in-band and used frequency (i.e., an in-band frequency assigned to a radio station in the geographic area of the testing environment). For example, in testing environments isolated from signals transmitted from a commercial radio station, the frequency of the radio signal can be any suitable in-band or out-of-band frequency. For a commercial radio station, the audio element may be modulated into a radio signal having an amplitude and/or frequency assigned to that radio station.

Continuing to step 506, one or more instructions may be selected for controlling an electronic device. For example, the one or more instructions can include commands that may be interpreted by a device to launch one or more non-radio-related device applications or processes, such as a web browser application, a map application, a music playback application, or an online music store application. In a testing environment, the one or more instructions can include test parameters, such as commands that may be interpreted by the device to selectively enable or disable one or more components of the electronic device (e.g., camera, backlight, or display), a length of time to run a test, a radio station to tune to for the test, or any other suitable test parameters. In general, any of the above-described instructions, or any other suitable type of instructions, may be selected at step 506.

Then, at step 508, a data packet may be created that includes the one or more instructions identified at step 504. For example, the data packet may conform to the specifications of an RDS data packet for transmission in an FM radio signal. In some embodiments, the data packet may be created using ASCII characters that are not alphanumeric so that a device receiving the data packet does not confuse the characters as call numbers or other text. At step 510, a checksum may be added to the data packet. The checksum may be computed using a particular coding algorithm. The coding algorithm may be selected such that a device receiving the data packet may verify the checksum to confirm that the data packet includes instructions for the electronic device. Alternatively, another type of data may be added to the data packet to indicate to the receiving device that instructions other than standard RDS data, for example, are included in the data packet. For example, encryption keys (e.g., a public and/or private key) may be added to the data packet.

Continuing to step 512, the data packet, which may include the instructions identified at step 506 and the checksum added at step 510 (or other type of data), may be modulated into a sub-carrier of a radio signal. In this way, the radio signal can carry both the audio element (e.g., in the main channel of the radio signal) and the one or more instructions (e.g., in the sub-carrier of the radio signal) at the same time. Then, at step 514, the radio signal may be broadcasted so that the signal may be received by one or more electronic devices.

At step 516, the radio source may determine whether the data packet, which may include the instructions and the checksum, has been transmitted a certain number of times (e.g., N times where N≥2). If not, process 500 may return to step 514, and the radio signal including the instructions may be transmitted again. This way, even if the electronic device does not successfully receive the instructions the first one or more times that the instructions were sent, the electronic device may still have the opportunity to obtain the instructions on subsequent transmissions.

If, at step 516, the radio source determines that the data packet has been transmitted the desired number of times, process 500 may continue to step 518. At step 518, the radio source may determine whether additional instructions should be sent to the one or more electronic devices. For example, additional instructions may be sent to start another test with different test parameters. As another example, if a radio station starts playing a different song, the radio station may determine that new instructions associated with the new song should be sent. The new instructions can include, for example, a command for the device to open a webpage using a web-browser application associated with the new song or a command for the device to search for locally-stored metadata (e.g., information or graphics, such as cover art) associated with the new song.

If, at step 518, the radio source determines that additional instructions are needed, process 500 may return to step 504 to begin the process of embedding different instructions in the radio signal. Otherwise, process 500 may continue to step 520 and end. In some embodiments, rather than ending, process 500 may or may not return to step 504 to modulate a different audio element into the radio signal.

Figure 6:
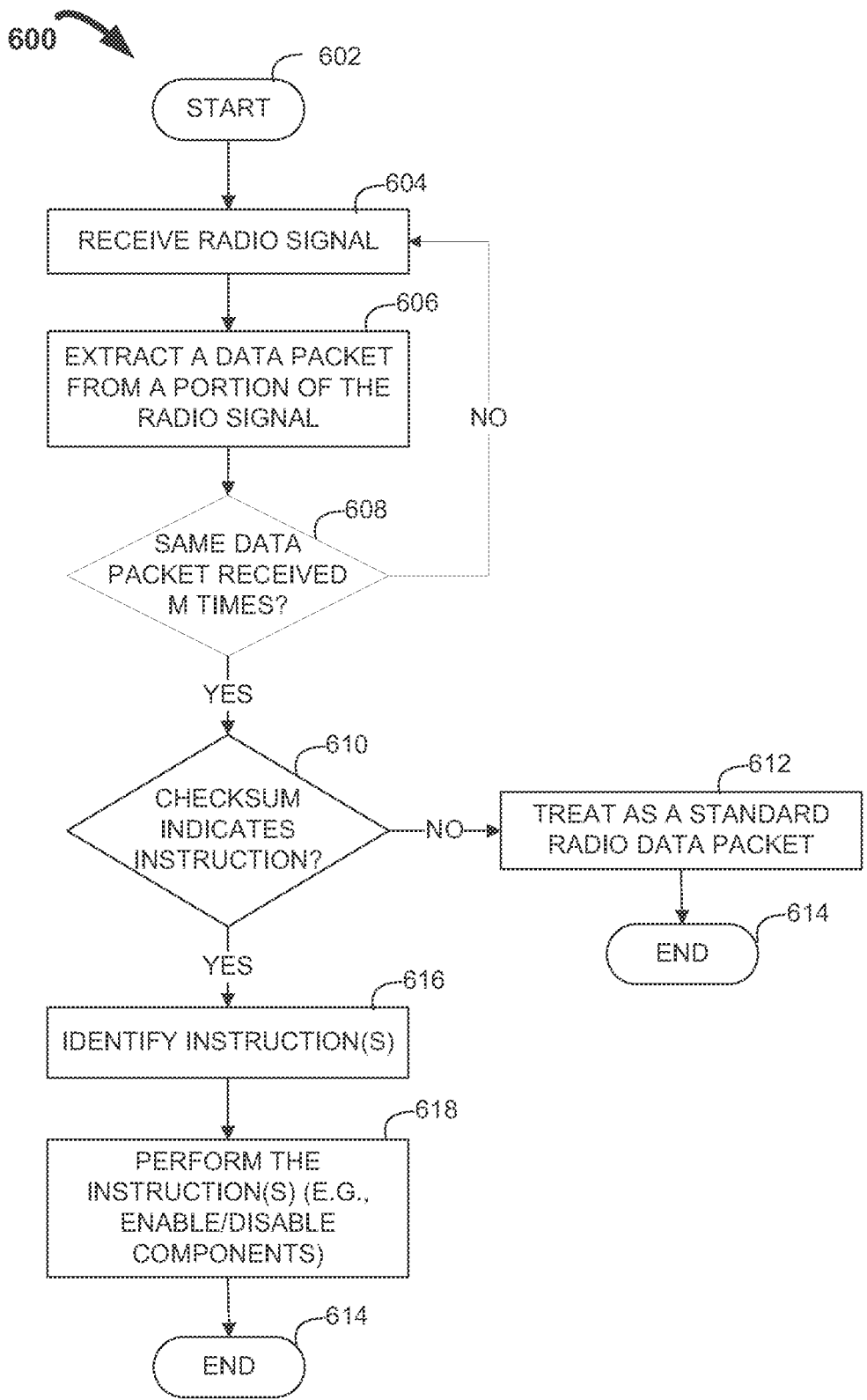
FIG. 6 is a flowchart of an illustrative process for performing electronic device instructions embedded in radio signals in accordance with various embodiments of the invention.

Turning to FIG. 6, a flowchart of illustrative process 600 is shown for performing instructions embedded in radio signals. Process 600 may be executed by a user electronic device, such as user electronic device 400 of FIG. 4 or any device capable of receiving and interpreting radio signals (e.g., FM radio signals).

Process 600 may begin at step 602. Then, at step 604, a radio signal may be received from a commercial radio station or a test control station, for example. A data packet may be extracted from a portion of the radio signal at step 606. For example, for an FM radio signal, the data packet may include some or all of an RDS data packet (e.g., the PSN field of the RDS data).

At step 608, the electronic device may determine whether the same data packet has been received at least a predetermined number of times (e.g., M times, such as M≥2). If not, process 600 can return to step 604 so that the electronic device can attempt to receive the same data packet another time. This way, the device executing process 600 can ensure that the data packet does not contain any errors before continuing with process 600. In some embodiments, process 600 may not include step 608, and the electronic device can instead determine whether the data packet was successfully received by verifying a checksum of the data packet.

In particular, at step 610, a checksum may be verified to determine whether the data packet includes instructions for the electronic device. The electronic device may use a particular coding algorithm to decode the checksum. In most scenarios, depending on the coding algorithm selected, a standard RDS data packet containing standard RDS data, for example, would not satisfy the checksum, and therefore the checksum would typically be satisfied only if the data packet contains instructions for the electronic device. In some embodiments, for extra insurance that a standard RDS data packet would not satisfy the checksum, the data packet may contain multiple checksums obtained using multiple coding algorithms, and step 610 may involve decoding multiple checksums instead of just one.

In some embodiments, in addition to or instead of using a checksum, the electronic device may use another technique to determine whether the data packet includes instructions. For example, non-alphanumeric ASCII characters in the data packet may indicate that instructions, rather than radio station call numbers, are included in the data packet. As another example, the data packet may include one or more encryption keys (e.g., public and/or private keys).

Thus, if the checksum (or other indicator) indicates that the data packet does not include instructions, process 600 may continue to step 612. At step 612, the data packet may be treated by the device as a standard radio data packet (e.g., RDS data packet) and process 600 may end at step 614. Alternatively, process 600 may return to step 604 to continue receiving and processing radio signals.

Otherwise, if at step 610 the checksum indicates that the data packet includes instructions, process 600 may continue to step 616. At step 616, the instructions may be identified from the data packet. Then, at step 618, the instructions may be performed. For example, the electronic device may enable or disable components of the electronic device, or the electronic device may start an application or process based on the instructions. Process 600 may then end at step 614. Alternatively, process 600 may return to step 604 to continue receiving and processing radio signals.

Figure 7:
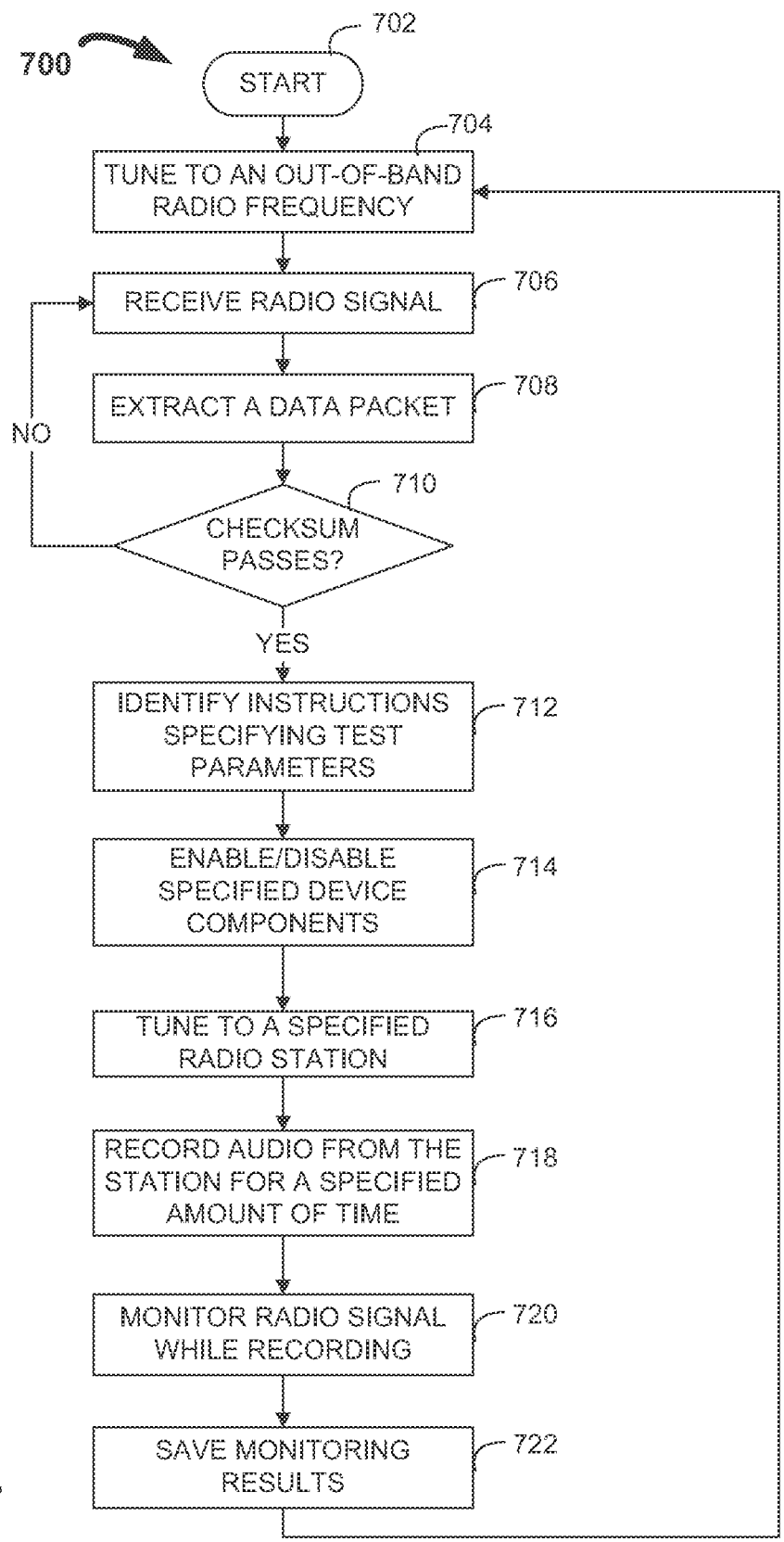
FIGS. 7 and 8 are flowcharts of illustrative processes for performing radio tests in accordance with various embodiments of the invention.

FIG. 7 is a flowchart of illustrative process 700 for performing a test of an electronic device. For example, the steps of process 700 may be used to test the quality of the electronic device's radio tuning circuitry and audio processing circuitry. Process 700 may be executed by any suitable electronic device, such as user electronic device 400 of FIG. 4 or any other of a variety of devices having radio reception capability.

Process 700 may begin at step 702. At step 704, the electronic device may tune to an out-of-band radio frequency. That is, the frequency may be used by a test control station for transmitting instructions to the electronic device (e.g., test control station 202 of FIG. 2), and may be a frequency that is not assigned to a radio station in the geographic area of the control station. In other embodiments, the electronic device may tune to an in-band radio frequency or the electronic device may remain tuned to a previously tuned in-band or out-of-band frequency. Then, at step 706, a radio signal may be received over the in-band or out-of-band radio frequency, at step 708, a data packet may be extracted from a portion of the received radio signal, and, at step 710, a checksum of the signal may be verified to determine whether the data packet includes test instructions. Steps 706, 708, and 710 may be performed in the same or similar manner as steps 604, 608, and 610 of FIG. 6, respectively, and may additionally include a step similar to step 608 (i.e., to attempt to receive the radio signal a certain number of times).

If, at step 710, the checksum passes and therefore indicates that the data packet includes instructions, process 700 may continue to step 712. Otherwise, process 700 may return to step 706 to receive another radio signal. At step 712, instructions specifying test parameters may be identified from the data packet. The test parameters may include instructions specifying certain device components to enable or disable during the radio test (e.g., camera, backlight, or display), which radio station to tune to for the radio test, and the duration of the radio test.

Then, starting at step 714, a radio test of the electronic device's radio may be set up and run. First, at step 714, one or more of the components of the electronic device may be enabled or disabled based on the test parameters. For example, the electronic device may enable a camera, backlight, or display of the electronic device to determine whether any of these components interfere with the ability of the electronic device to receive and process audio data from a radio signal. Then, at step 716, a radio station specified by the test parameters may be tuned to by the device. For example, the specified radio station may be a commercial radio station that broadcasts music to the geographic region of the device. In other embodiments, the instructions may specify that the electronic device remain tuned to the out-of-band frequency (if an out-of-band frequency is used), and that the radio test be run using audio or other media provided from the test control station.

After steps 714 and 716, and/or performing any other instructions specified by the test parameters to set up the electronic device for a test, the test may begin at step 718. In particular, at step 718, audio from the specified radio station or the test control station may be recorded for a period of time specified by the test parameters. Alternatively, audio may be recorded for a default amount of time unrelated to the test parameters. While the audio from the radio station is recorded, the radio signal may be monitored for other occurrences or activities at step 720. For example, the electronic device may monitor the radio signal for interruptions in the signal, periods where the signal fades, high frequency buzzing, or for any other undesirable circumstances.

Continuing to step 722, the recorded and monitored audio may be stored (e.g., in a local memory of the device) and analyzed. For example, the recorded and monitored audio may be post-processed automatically, or a test engineer may manually retrieve and listen to the recorded audio to determine whether the audio is of acceptable quality. In addition to the audio itself, any test parameters may be stored and associated with the recorded audio. In this way, the test engineer can recall the conditions of the test and analyze the recorded and monitored audio based on these conditions.

In some embodiments, process 700 may return to step 704 after the current test is concluded. Thus, the electronic device may once again tune to the out-of-band frequency to receive any additional test parameters for the next test, if necessary. In other embodiments, the electronic device may remain tuned to the frequency previously tuned to at step 716, and process 700 may return to step 706. At step 706, the electronic device can receive a radio signal from the frequency that may include test parameters for another test. Thus, using this approach, the electronic device may not be limited to receiving instructions from any particular in-band or out-of-band frequency. The electronic device may continue receiving test parameters and running tests from the out-of-band radio signal or from one or more in-band radio signals until a test engineer manually interrupts testing, a test control station sends instructions using a radio signal to stop the tests, or using any other suitable approach to end the radio tests.

Figure 8:
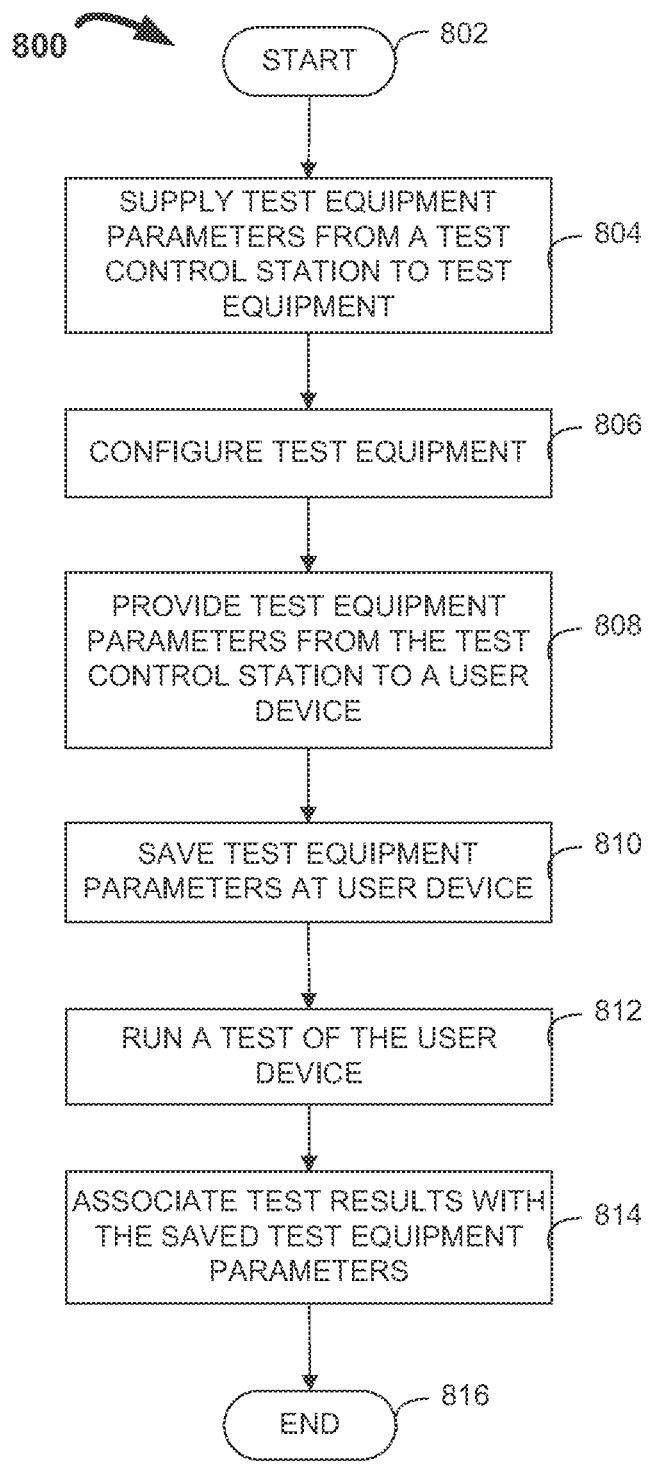

Moving to FIG. 8, a flowchart of process 800 is shown for performing radio tests to test the quality of a user electronic device's radio in accordance with various embodiments of the invention. The steps may be performed by the components of a test system, such as test system 200 of FIG. 2. For example, the various steps may be performed by test control station 202, user electronic device 204, and/or test equipment 208.

Process 800 may begin at step 802. At step 804, test equipment parameters may be supplied to test equipment (e.g., AM or FM radio, infrared transmissions, wired link, or direct input onto equipment such as a thermostat, etc.). In some embodiments, the test equipment parameters may be supplied from a test control station similar to how instructions are sent to a device in FIG. 7, for example. The test equipment parameters may include, for example, orientation data specifying how the test equipment should position the user electronic device relative to the test control station. The test equipment parameters may indicate any other test conditions, such as the temperature, humidity, or lighting of the testing environment, which should be used to affect the electronic device during a test.

At step 806, the test equipment may be configured. In some embodiments, the test equipment may be configured based on the test equipment parameters received at step 804. For example, the test equipment can rotate or move the user electronic device in any suitable direction and to any suitable degree based on orientation data received as part of the test equipment parameters. In other embodiments, step 804 may be skipped, and the test equipment may be configured based on manual manipulation of the test equipment by a test engineer. For example, the test equipment can rotate or move based on torque applied to the test equipment by a test engineer. In still other embodiments, the test equipment may be configured based on a combination of manual manipulations and supplied test equipment parameters.

Continuing to step 808, the test equipment parameters may be provided from the test control station to the user electronic device. The test equipment parameters may include the same information as that provided to the test equipment at step 804, and/or may be information indicative of how the test equipment was manually manipulated to achieve a certain configuration. The test equipment parameters may be transmitted to the user electronic device using radio signals, such as using any of the techniques described above in connection with FIG. 7, for example.

At step 810, the test equipment parameters may be saved at the user electronic device, such as in memory/storage 406 of FIG. 4. The test equipment parameters may specify instructions for configuring the test equipment, but may not affect how the user electronic device is expected to operate. Thus, at step 810, the user electronic device may save the test equipment parameters without changing any of its own operations based on the test equipment parameters. Instead, the user electronic device may receive other test parameters from the test control station that affect how the user electronic device is expected to operate (e.g., parameters indicating length of test, which components to enable or disable, etc. as described with respect to FIG. 7), which may also be saved by the user electronic device.

At step 812, a radio test of the user electronic device may be run. The radio test may be used to test the audio quality of a radio implemented on the user electronic device, and may include any of the features and functionalities of the tests discussed above. Then, at step 814, the results of the test (e.g., audio recordings) may be associated with the test equipment parameters saved at step 810.

In this way, when the test results are analyzed, factors that may have an impact on the performance of the user electronic device during the test can be obtained from the user electronic device. The test equipment parameters do not have to be reconstructed from information stored in the test control station or the test equipment.

The described embodiments of the invention are presented for the purpose of illustration and not of limitation.

What is claimed is:

1. A method of testing an electronic device, comprising:
   receiving a radio signal at the electronic device;
   extracting a data packet from a portion of the radio signal using the electronic device, wherein the extracted data packet comprises at least a portion of a radio data system ("RDS") data packet of the radio signal;
   determining, using the electronic device, that the extracted data packet comprises an indicator that the extracted data packet includes instructions to be performed by the electronic device, wherein the indicator is an encryption key;
   identifying, in response to the determining, at least one test parameter from the extracted data packet using the electronic device; and
   performing a test on the electronic device using the at least one test parameter.

2. The method of claim 1, wherein the performing the test comprises testing the quality of a radio receiver of the electronic device.

3. The method of claim 2, wherein the performing the test further comprises:
   enabling at least one component of the electronic device based on the at least one test parameter, wherein the at least one component comprises at least one of a backlight, a display, and a camera of the electronic device; and
   testing the quality of the radio receiver while the at least one component is enabled.

4. The method of claim 2, wherein the receiving comprises receiving the radio signal with the radio receiver from a first radio channel, and wherein the performing the test comprises:
   tuning the radio receiver to a second radio channel based on the at least one test parameter; and
   processing audio from the second radio channel using audio processing circuitry of the electronic device.

5. The method of claim 4, wherein the performing the test further comprises:
   recording the processed audio from the second radio channel; and
   analyzing the processed audio recorded from the second radio channel.

6. The method of claim 4, wherein the first radio channel is an out-of-band radio channel.

7. The method of claim 1, wherein the RDS data packet is transmitted with the radio signal to the electronic device using a RDS protocol.

8. The method of claim 1, wherein the at least a portion of the RDS data packet comprises a Program Service Name ("PSN") field of the RDS data packet.

9. The method of claim 8, wherein two characters of the PSN field correspond to a first test parameter of the at least one test parameter for tuning the electronic device to a frequency of a particular radio station.

10. The method of claim 8, wherein two characters of the PSN field correspond to a first test parameter of the at least one test parameter for defining a time duration of the test.

11. The method of claim 8, wherein two characters of the PSN field correspond to a first test parameter of the at least one test parameter for defining at least one test equipment parameter of the test.

12. The method of claim 8, wherein one character of the PSN field corresponds to a first test parameter of the at least one test parameter for enabling a component of the electronic device.

13. The method of claim 8, wherein one character of the PSN field corresponds to a checksum of the extracted data packet.

14. The method of claim 1, wherein the performing the test comprises using an application stored on the electronic device.

15. The method of claim 1, wherein the radio signal comprises one of an amplitude modulated ("AM") radio signal and a frequency modulated ("FM") radio signal.

16. An electronic device comprising:
   radio tuning circuitry configured to receive a radio signal; and
   control circuitry coupled to the radio tuning circuitry, wherein the control circuitry comprises:
      a radio data system ("RDS") decoder configured to extract a data packet from a portion of the radio signal, wherein the portion of the radio signal comprises at least a portion of a RDS data packet of the radio signal; and
      processing circuitry configured to:
         determine that the extracted data packet comprises an indicator that the extracted data packet includes instructions to be performed by the electronic device, wherein the indicator is an encryption key;
         identify, in response to the determining, at least one test parameter from the extracted data packet; and
         perform a test on the electronic device using the at least one test parameter.

17. The electronic device of claim 16, wherein the radio signal comprises one of an amplitude modulated ("AM") radio signal and a frequency modulated ("FM") radio signal.

18. A non-transitory computer readable medium storing instructions executable by control circuitry of an electronic device to cause the electronic device to:
- receive a radio signal at the electronic device;
- extract a data packet from a portion of the radio signal using the electronic device, wherein the extracted data packet comprises at least a portion of a radio data system ("RDS") data packet of the radio signal;
- determine, using the electronic device, that the extracted data packet comprises an indicator that the extracted data packet includes instructions to be performed by the electronic device, wherein the indicator is an encryption key;
- identify, in response to the determining, at least one test parameter from the extracted data packet using the electronic device; and
- perform a test on the electronic device using the at least one test parameter.

19. The non-transitory computer readable medium 18, wherein the performing the test comprises testing the quality of a radio receiver of the electronic device.

20. The non-transitory computer readable medium 19, wherein the performing the test further comprises:
- enabling at least one component of the electronic device based on the at least one test parameter, wherein the at least one component comprises at least one of a backlight, a display, and a camera of the electronic device; and
- testing the quality of the radio receiver while the at least one component is enabled.

* * * * *

UNITED STATES PATENT AND TRADEMARK OFFICE
CERTIFICATE OF CORRECTION

PATENT NO.        : 8,761,683 B2                                Page 1 of 1
APPLICATION NO.   : 12/549911
DATED             : June 24, 2014
INVENTOR(S)       : Daniel A. Warren et al.

It is certified that error appears in the above-identified patent and that said Letters Patent is hereby corrected as shown below:

In the Claims:

Claim 19, Column 17, Line 19, please delete "medium 18," and substitute -- medium of claim 18, --

Claim 20, Column 17, Line 22, please delete "medium 19," and substitute -- medium of claim 19, --

Signed and Sealed this
Fourteenth Day of October, 2014

Michelle K. Lee
*Deputy Director of the United States Patent and Trademark Office*